United States Patent [19]

Vali

[11] Patent Number: 4,659,918
[45] Date of Patent: Apr. 21, 1987

[54] PATTERN TRACER WITH DUAL SCAN SLOWDOWN CIRCUIT

[75] Inventor: Enn Vali, Burlington, Canada

[73] Assignee: Westinghouse Canada Inc., Hamilton, Canada

[21] Appl. No.: 693,571

[22] Filed: Jan. 22, 1985

[30] Foreign Application Priority Data

Mar. 21, 1984 [CA] Canada .................................. 450132

[51] Int. Cl.$^4$ ............................................. G05B 1/00
[52] U.S. Cl. ..................................... 250/202; 318/577
[58] Field of Search ....................... 250/200, 201, 202; 318/576, 577, 611, 620, 621, 622, 640

[56] References Cited

U.S. PATENT DOCUMENTS

| | | | |
|---|---|---|---|
| 3,704,372 | 11/1972 | Parker et al. | 250/202 |
| 3,860,862 | 1/1975 | Dell et al. | 250/202 |
| 3,883,735 | 5/1975 | Murphy et al. | 250/202 |

Primary Examiner—Eugene R. LaRoche
Assistant Examiner—D. C. Mis
Attorney, Agent, or Firm—Edward H. Oldham

[57] ABSTRACT

In a circular scanning pattern tracing system, a dual scanning pattern is provided to detect pattern changes in advance of the system steering axis. Pattern detection pulses from both the scanning patterns are adjustable in length and the overlap of the pulses is used to determine whether the system should slow down.

4 Claims, 1 Drawing Figure

PATTERN TRACER WITH DUAL SCAN SLOWDOWN CIRCUIT

FIELD OF THE INVENTION

This invention relates to optical pattern tracers and in particular to circuits for controlling the speed of operation of the tracer in approaching pattern deviations.

BACKGROUND OF THE INVENTION

Optical pattern tracers and in particular those of the circular scanning non-steering type are disclosed for example, in U.S. Pat. No. 3,704,372 issued Nov. 28, 1972 to Robert E. Parker et al; U.S. Pat. No. 3,727,120 issued Apr. 10, 1973 to George S. Jewell et al; U.S. Pat. No. 3,860,862 issued Jan. 14, 1975 to William Dell et al and U.S. Pat. No. 3,883,735 issued May 15, 1975 to Francis P. Murphy et al. These tracers normally scan the pattern by reflecting a portion of the pattern from a mirror onto an optically sensitive device. The mirror is rotated to cause the portion of the pattern viewed to rotate about a center and produce a circular scan. The signal produced by the optically sensitive device may then be processed and produce coordinate velocity signals which may be used to cause the tracer to follow in the pattern at a constant tangential velocity. All pattern followers must view the pattern at a point in advance of the actual axis of steering or physical rotation of the apparatus. Failure to provide sufficient advance will result in system instability or inability of the tracer to follow rapid deviation. The degree of advance is related to the accuracy of tracing and a trade-off occurs between the stability of the system, the accuracy of tracing and the velocity of tracing. Various systems have been proposed in the past to enable a tracer to operate at relatively high tracing speed and slowdown in advance of rapid deviations thus enabling accuracy at the turns and high velocity between turns. Such a system is disclosed in U.S. application No. 626,221 filed June 29, 1984 in the name of Robert E. Parker, et al. In that system two scans of different diameter are used. One scan is used to detect rapid deviation well in advance of the tracer and the other scan is used for normal steering purposes.

The prior art for this invention is disclosed in the foregoing Application where coincidence of the pulse from the normal scanner and from the advance scanner is used to determine whether or not the machine should slow down. The absence of coincidence or overlap between the pulses from both scanners, for a period of more than one scanning cycle results in a slowdown signal.

SUMMARY OF THE INVENTION

In accordance with the present invention, the durations of the advance signal and the tracing signal are adjustable but of the same value and the degree of overlap therefore indicates a pattern direction change in either direction. The adjustable function permits the slowdown signal to be produced in response to a selectable pattern deviation.

BRIEF DESCRIPTION OF THE DRAWINGS

FIG. 2 is a series of graphs to explain the operation of the circuit of FIG. 1.

DESCRIPTION OF THE PREFERRED EMBODIMENTS

Figure 1:
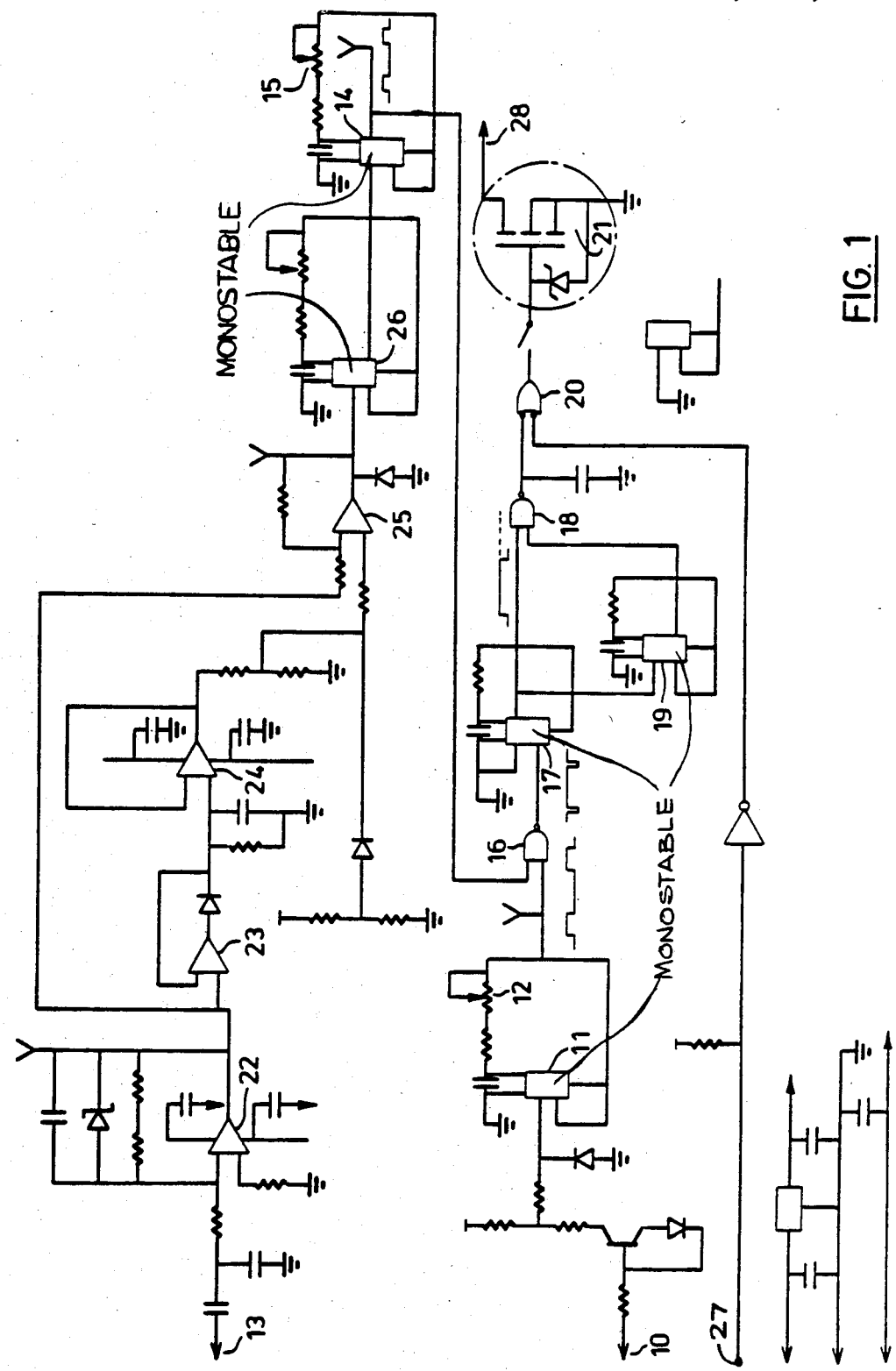
FIG. 1 is a circuit diagram of a system in accordance with this invention.

Considering first FIG. 1, it will be seen that an input signal from a scanner of the normal type disclosed in the foregoing Application is applied to terminal 10 and thence to a monostable 11 to NAND gate 16 and from NAND gate 16 to monostable 17. The output from monostable 17 is applied to NAND gate 18 and monostable 19. The output from NAND gate 18 is applied to NAND gate 20 and the output from NAND gate 20 is applied to FET 21. The output from FET 21 is used to control the speed of operation of the system. A further signal derived from a scan of larger diameter as described in the foregoing Canadian application is applied to terminal 13 and thence through amplifiers and shapers 22, 23 and 24 and 25 to monostable 26 and the output from monostable 26 is applied to monostable 14. Monostable 14 has adjustable delay and an output which is applied to NAND gate 16. Slowdown enable signal is applied to terminal 27 and thence to NAND gate 20.

Turning now to FIG. 2, it will be seen that input from monostable 26 is shown at A in FIG. 2. The signal represents the time of interception of the advance scan and the pattern. The output from monostable 14 is shown at B in FIG. 2 and is an adjustable length determined by the value of resistor 15. As a matter of convenience of illustration, it is shown to have a duration of a fixed value. The input of the sample pulse to terminal 10 is shown at C in FIG. 2 and at the beginning of these graphs at time 0 it is assumed that there is coincidence between the advance signal of graph A and the sample pulse of graph C. The sample pulse triggers in monostable 11 which produces a signal as shown at D in FIG. 2, also of variable length but of the same length as the output produced from monostable 14 as illustrated at B. Thus the pulses illustrated at B and D in FIG. 2 must have the same duration even though they are adjustable in length. The waveforms shown at B and D in FIG. 2 are combined in NAND gate 16 and produce an output as shown at E in FIG. 2. It will be seen that this output commences with coincidence of the waveform at B and D and terminates when they no longer coincide. This signal is applied to monostable 17 which has a time longer than one complete scanning cycle and therefore monostable 17 is switched into its "on" condition for a period continuing as long as pulses are provided to its input, each scanning cycle is in the form of the waveform shown at E. When no such pulses arrive, the monostable reverts to its stable condition as shown at F in FIG. 2. At a later point in time when pulses are once received from NAND gate 16, monostable 17 is once more triggered into an "on" condition and produces the output as shown in the latter portion of the graph at F. The time scale of the graphs in the latter portion of FIG. 2 is substantially different than that in the earlier portion, being approximately a ratio of 5 to 1. The time scales of the various portions of the graph is of no great importance, since it is only provided for purposes of illustration. As will be seen, the waveform F from monostable 17 is triggered once more producing the output shown at the right hand side of FIG. 2. An output from monostable 17 is applied to monostable 19 which produces a waveform as shown at H in FIG. 2. The waveform H is a logic 0 output which commences when the output from monostable 17 goes to logic 1 and continues for about 0.5 seconds. The output from monostable 17 and 19 are combined in NAND gate 18 to produce an output as shown at I in FIG. 2. Presuming a slowdown enable signal which is a logic 0 is applied to terminal 27 and thence to NAND gate 20, the output from NAND gate 20 will be as shown in I and this in turn will be applied to FET 21 and produce a slowdown signal at terminal 28 as shown at J in FIG. 2. It will be noted that the slowdown once commenced continues for a period determined by the length of the waveform shown at H, that is for 0.5 seconds, even after the slowdown from monostable 17 has terminated. This ensures that the tracer is well clear of the corner or pattern curvature before normal operating is resumed. The slowdown enable signal, that is logic 0 at terminal 27, enables the operator to select slowdown from the operators console. The output from FET 21 is applied to the normal slowdown circuit to change the speed input to the X and Y control system in a manner well known in the art and described in the preceeding referenced application.

I claim:

1. In a circular scanning optical pattern tracer, means to generate a first signal indicative of intersection of the pattern and an optical scan of a first diameter, means to generate a second signal indicative of intersection of the pattern and an optical scan of a second diameter, means to produce from said first and second signals respective control signals of adjustable duration, means to detect coincidence of said control signals and produce in response thereto, a slowdown signal indicative of the deviation of the pattern from a straight line in advance of the center of rotation of said circular scan and means to utilize said slowdown signal to control the tangential velocity of said tracer.

2. The system as claimed in claim 1 wherein the duration of said control signals is determined by a common control.

3. The system as claimed in claim 1 wherein coincidence of said control signals produces a slowdown signal which continues, after said coincidence terminates for a predetermined period of time.

4. A system as claimed in any of claims 1 to 3 including means to activate said system from a remote location.

* * * * *